H. P. DAVIES.
NUT LOCK.
APPLICATION FILED AUG. 20, 1908.
939,124.
Patented Nov. 2, 1909.
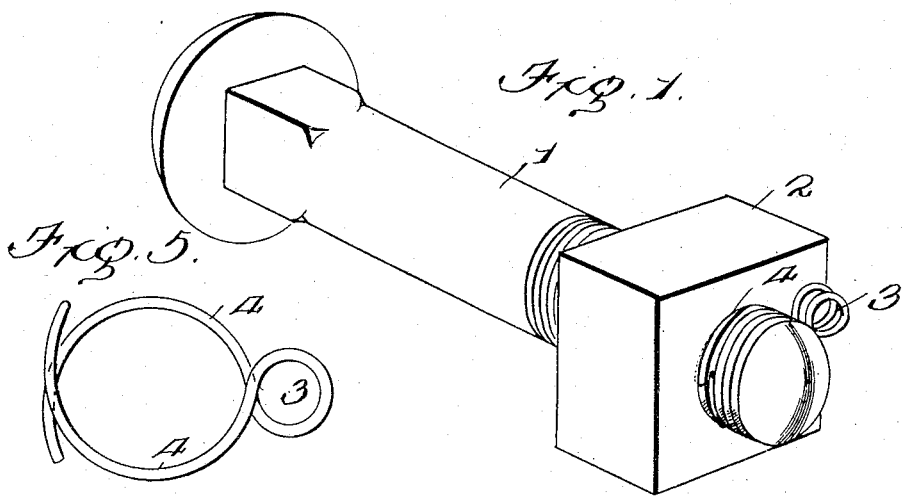
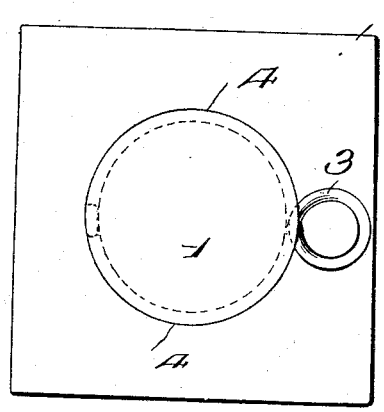
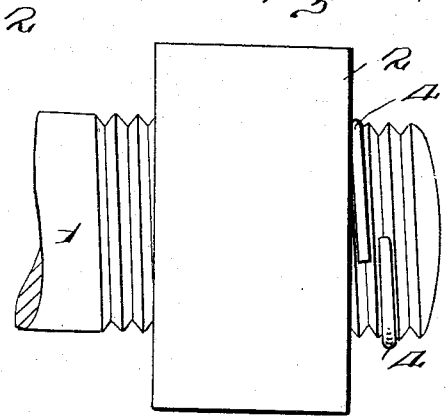
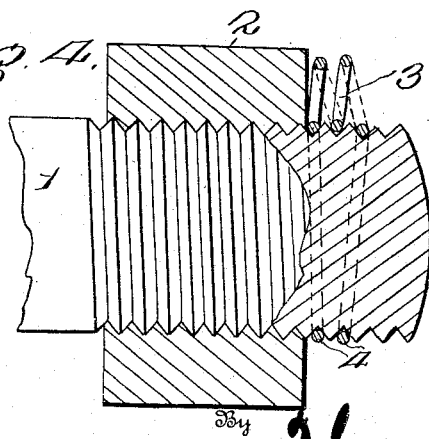
Witnesses
Inventor
H. P. Davies
By Lacey, Attorneys

UNITED STATES PATENT OFFICE.

HOWARD P. DAVIES, OF SCRANTON, PENNSYLVANIA.

NUT-LOCK.

939,124.     Specification of Letters Patent.     Patented Nov. 2, 1909.

Application filed August 20, 1908. Serial No. 449,525.

*To all whom it may concern:*

Be it known that I, HOWARD P. DAVIES, citizen of the United States, residing at Scranton, in the county of Lackawanna and State of Pennsylvania, have invented certain new and useful Improvements in Nut-Locks, of which the following is a specification.

The object of my invention is primarily to provide a simple, inexpensive and practical device, whereby nuts when placed in position upon their bolts, shall be held from accidental unlocking, and in this connection, a further object is to provide a nut lock of such construction that it may be easily expanded so as to be slipped over a bolt and then snapped into place thereon, and further to so construct the lock that it may be easily manipulated, but will hold in place under all service conditions.

For a full understanding of the invention and the merits thereof, and to acquire a knowledge of the details of construction, reference is to be had to the following description and accompanying drawings, in which:

Figure 1 is a perspective view of the nut lock in position on the bolt; Fig. 2 is an end view thereof; Fig. 3 is a side elevation; Fig. 4 is a longitudinal sectional view; and, Fig. 5 is a detail view of the locking device detached from the bolt.

Corresponding and like parts are referred to in the following description and indicated in all the views of the drawings by the same reference characters.

Referring to the drawings, the numeral 1 designates a bolt, and 2 a nut of ordinary construction.

The locking device is constructed of one piece of resilient metal of any suitable cross section, and consists of a coil or coils 3 formed by one or more convolutions of the material of the device, the projecting ends of the wire, beyond said coil, crossing each other in opposite directions, and then being formed into opposed outwardly bowed clamping legs or jaws 4 adapted to embrace a bolt and engage the threads thereof. Preferably, the clamping legs are of such length as to normally overlap or cross each other at their ends when the legs are in an unexpanded condition. By this means, the legs 4 may be forced apart from each other or expanded in any suitable manner, and the ends of the legs abutted against each other. In this condition, the device takes the form of a ring of larger diameter than the bolt upon which it is to be used, the ring being capable of being easily slipped over the bolt and placed in position without the necessity of being threaded or screwed upon the bolt threads. The resilience of the coil 3 forces the clamping members 4 inward and into the valley of the threads when placed in position on the bolts, and this resilience may be more or less increased by increasing the number of convolutions of the coil 3.

When in place upon the bolt, the clamp members or legs straddle the bolt and assume a position wherein torsional strain is exerted upon the clamp members, and when in position against the outer face of the nut, it is practically impossible to turn the locking device in either direction, owing to its position relative to the threads of the bolt, and a combined binding and clamping effect produced thereby. When it is desired to release the lock, a pin may be inserted in the coiled wire 3, and sufficient force easily applied to unscrew the lock entirely, or in case this method of procedure is impossible, the coil may be oppositely clamped and compressed from opposite directions, which will act to force open the clamping members 4, so that the lock may be withdrawn.

It will be seen that my device is extremely simple, may be very cheaply made, can be easily opened and held open, and may also be easily removed from the nut by manipulation when desired.

Having thus described the invention, what is claimed as new is:—

1. A nut locking device consisting of a single piece of resilient wire bent in a circle intermediate of its ends to form a closed coil, the ends of the wire beyond said coil crossing each other and being bent to form opposed outwardly bowed clamping legs adapted to embrace a bolt and engage the threads thereof, said coil forming means whereby the legs may be opened relatively to each other to permit the device to be easily removed from a bolt.

2. A nut locking device consisting of a single piece of wire bent intermediate of its ends in a circle to form a closed coil, the projecting ends of said wire, beyond the coil, crossing each other and forming opposed outwardly bowed clamping legs adapted to embrace a bolt and engage the threads thereof, said legs being of such extent as to overlap and cross each other at their ends when the legs are in their unexpanded position and being thereby adapted to be expanded until the ends abut against each other, and in this condition to be slipped over the bolt and then released from their abutting engagement to resiliently clasp the bolt.

In testimony whereof I affix my signature in presence of two witnesses.

HOWARD P. DAVIES. [L. S.]

Witnesses:
JAMES H. DUNHAM,
GEORGE T. DUNHAM.